United States Patent [19]

Dahan et al.

[11] 4,398,171

[45] Aug. 9, 1983

[54] VIDEO SYSTEM FOR PLOTTING AND TRANSMITTING VIDEO TRAFFIC INFORMATION

[76] Inventors: Pierre-Louis Dahan, 106, Blvd. Pereire, 75017 Paris; Phac Letuan, 5, Parc de la Vievr, L'Hay-Les-Roses, both of France

[21] Appl. No.: 236,991

[22] Filed: Feb. 23, 1981

[30] Foreign Application Priority Data

Feb. 26, 1980 [FR] France ............................... 80 04196

[51] Int. Cl.³ ............................................. G08G 1/09
[52] U.S. Cl. ..................................... 340/22; 340/720; 340/734
[58] Field of Search .................. 340/22, 720, 734, 745

[56] References Cited

U.S. PATENT DOCUMENTS 3,466,598  9/1969  Cruger et al. ............................. 340/22
3,537,096 10/1970  Hatfield ................................ 340/734
3,899,662  8/1975  Kreeger et al. ....................... 340/745
3,988,533 10/1976  Mick et al. ........................... 340/720
4,317,114  2/1982  Walker ................................ 340/734

*Primary Examiner*—Glen R. Swann, III
*Attorney, Agent, or Firm*—Kane, Dalsimer, Kane, Sullivan and Kurucz

[57] ABSTRACT

A video system for assisting automobile traffic is provided. Radio frequency signals concerning traffic flow and build-up are transmitted to a receiver unit contained within a motor vehicle. The receiver unit contains road map information stored in a memory and only information relating to traffic flow is transmitted. The receiver superimposes the traffic flow information with the map information to produce a composite image of traffic conditions. The traffic flow information is updated and stored in a memory while obsolete information is blanked out so that current traffic information may be presented to the viewed.

6 Claims, 11 Drawing Figures

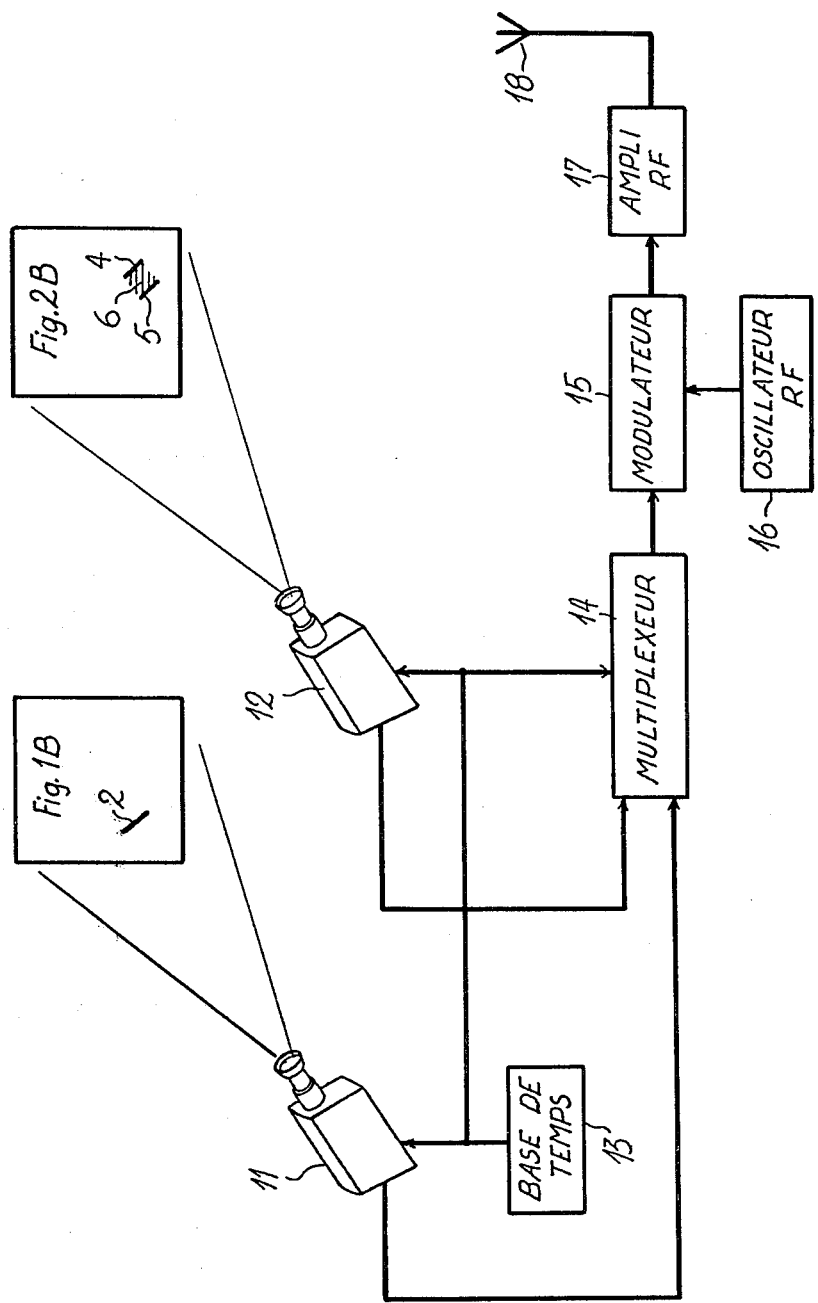

VIDEO SYSTEM FOR PLOTTING AND TRANSMITTING VIDEO TRAFFIC INFORMATION

BACKGROUND OF THE INVENTION

The present invention concerns a video system for assisting automobile traffic wherein traffic flow and traffic build-up signals are transmitted along a radio-frequency channel by a transmitter unit to receiver units placed in motor vehicles and are displayed on screens that can be seen by the drivers.

The transmitter unit transmits a series of images or messages in sequence concerning only traffice flow and build-up indications to the exclusion of plans or maps of the zones to which the indications refer. These plans or maps are memorized in the receiver unit and can be selected and displayed on the display screen. The indication signals contain the information required for identifying the map or plan to which they refer and for localizing them on this plan or map.

It thus results that the complete map or plan of traffic flow and build-up in a sector comprises a map or plan background memorized locally and displayed as an image fixed part and a traffic flow and build-up indication superimposed on the screen on this map or plan background which constitutes a variable part of the image. The image or the message transmitted by the transmitter unit contains only this variable information to the exclusion of any basic fixed information.

This image or message therefore only calls for a small pass band and the transmission is made at a relatively low carrier frequency of the same magnitude as those used for communications between fixed and moving units and not at a UHF carrier frequency approaching those used in television networks.

SUMMARY OF THE INVENTION

To summarize then, the image displayed on the receiver unit screen results from adding a fixed image formed locally using data memorized in the receiver unit and a variable image received from the transmitter.

The receiver unit chooses the image amongst those transmitted by time multiplexing in the transmitter unit which has a predetermined address. This image (or the message which describes it) is sampled and the samples are stored in a variable-image memory. The map or plan backgrounds are memorized as image samples in a fixed image-memory.

The moving and fixed image memories are scanned in synchronism and the composite image is displayed on the screen.

The transmitter unit sequentially transmits several moving images representing several traffic-flow sectors which are time multiplexed. The result of this is that the recurrence frequency of the variable image of a sector a sent by the transmitter is lower than the refreshing frequency of the corresponding image on the screen. The image displayed is thus not directly the image received but rather a periodic reproduction at a relatively high refreshing frequency of the image stored in the variable-image memory. The method of updating the variable-image will be seen hereinafter.

BRIEF DESCRIPTION OF THE DRAWINGS

The invention will now be described in detail with reference to the drawings appended hereto wherein:

FIG. 3 represents, in block-diagram form, the transmitter unit used in the transmission system for assisting the motor vehicle traffic flow;

DETAILED DESCRIPTION OF THE PREFERRED EMBODIMENT

Figure 1A:
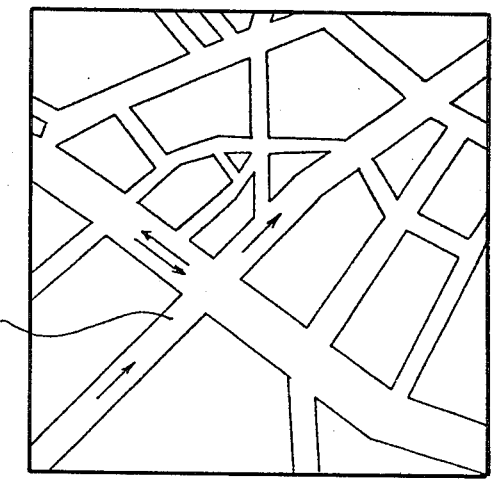
FIGS. 1A, 1B and 1C represent a fixed image, a variable image and a composite image respectively, where the latter image corresponds to a first case of traffic buildup.
Figure 1B:
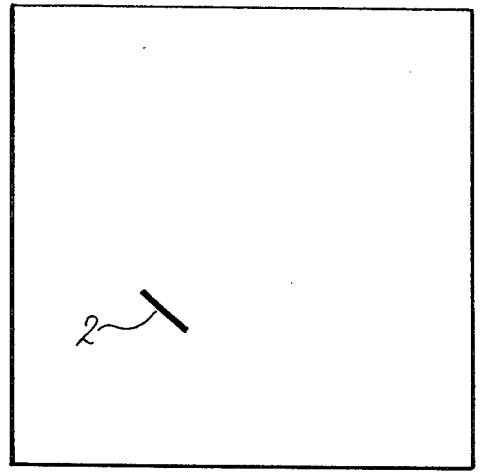
Figure 1C:
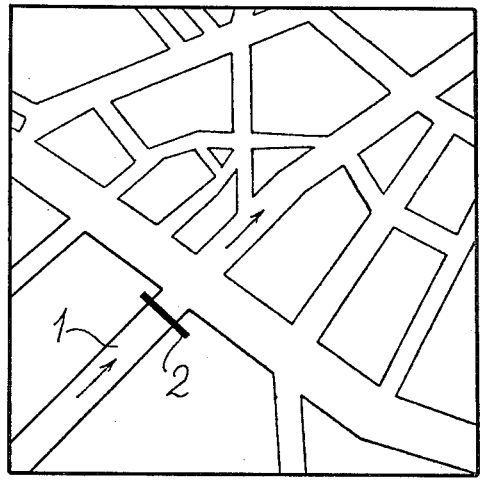
Figure 2A:
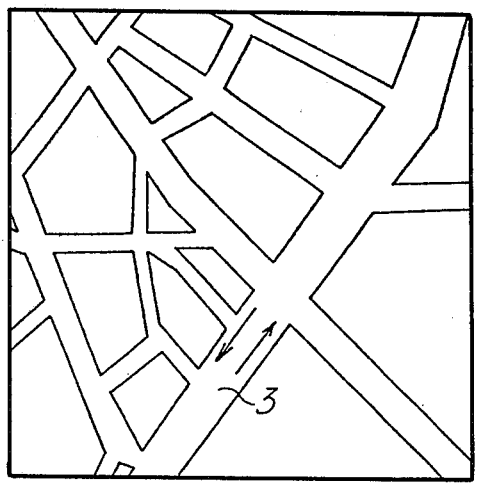
FIGS. 2A, 2B and 2C represent a fixed-image a variable image and a composite image respectively, where the latter image corresponds to a second case of traffic build-up.
Figure 2B:
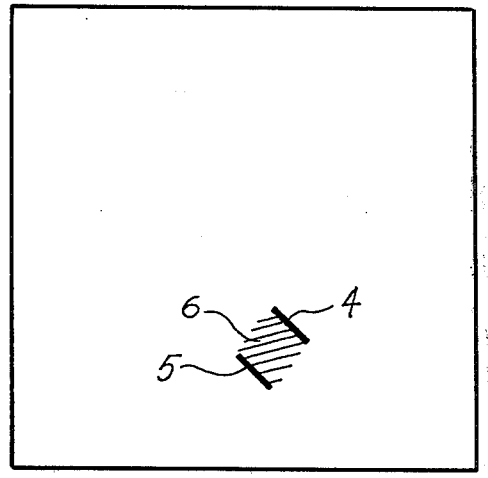
Figure 2C:
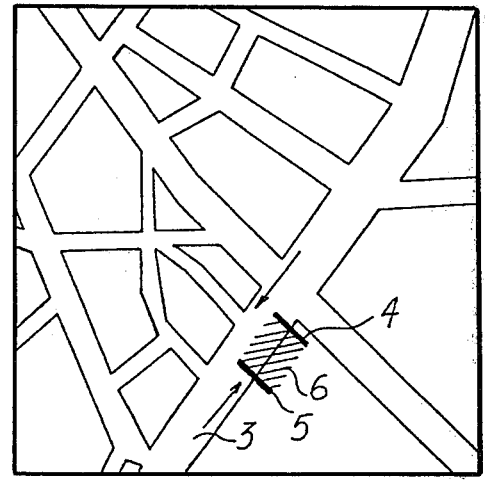

Looking now at FIGS. 1A, 1B and 1C, FIG. 1A depicts the plan of a town's district; FIG. 1B depicts the traffic flow and build-up signals and FIG. 1C is a representation of FIGS. 1A and 1B superimposed. In a similar way, FIG. 2A depicts the plan of a town's district; FIG. 2B depicts the traffic flow and build-up signals and FIG. 2C is a superposition of FIGS. 2A and 2B.

Avenue 1 (FIG. 1A) is a one-way street and is blocked off (FIG. 2B) by a thick bar 2 covering the whole width of the street, indicating that there is traffic build-up on avenue 1 at the point shown by bar 2.

Road 3 (FIG. 2A) has two-way traffic and is blocked off (FIG. 2B) by two separated bars 4 and 5 covering just half the width of the road. Between the two bars is a shaded area 6. This means that the direction corresponding to the traffic lane blocked off by bars 4 and 5, there is a traffic jam depicted by shaded area 6.

The indications employed for pointing out traffic build-up, jams, detours, parts of the road under black ice, snow, floods, . . . can give rise to a wide choice of symbols and signs and the present invention is in no way bound by the choice made.

With reference now to FIG. 3, elements 11, 12, . . . represent cameras receiving synchronization signals from a time base 13 and scanning FIGS. 1B, 2B, . . . respectively. The output signals from cameras 11, 12, . . . are time multiplexed in multiplexer 14; the multiplexed signal is fed into a modulator 15 receiving a radio-frequency wave from an oscillator 16 and the modulated radio-frequency signal is fed into a radio-frequency amplifier 17 and a transmitter aerial 18.

Each video signal comprises an identification address, represented for instance by a desired number of pulses, in the raster return interval.

Figure 4:
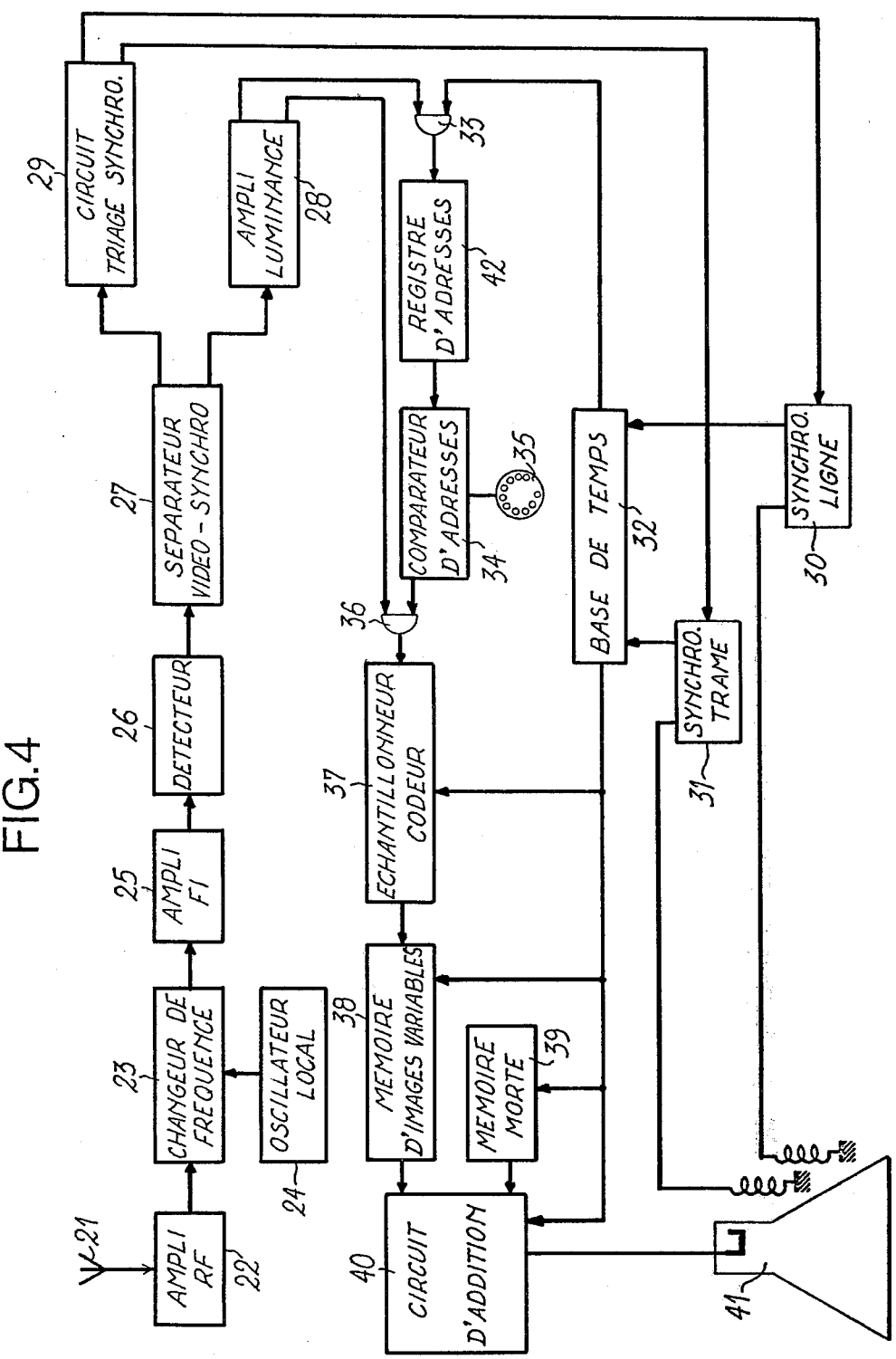
FIG. 4 represents, in block-diagram form, a receiver unit in a first embodiment of the system.

FIG. 4 depicts one receiver unit embodiment. It comprises an aerial 21, a radio-frequency amplifier 22, a frequency changer 23 receiving a local wave from a local oscillator 24, an intermediate-frequency amplifier 25 and a detector 26. Detector 26 is linked to a video separator 27. The video signal is fed into a luminance amplifier 28. The synchronization signal is fed into a synchronization sorting circuit 29. Lastly, synchronization sorting circuit 29 is linked to a synchro-line circuit 30 and a synchro-raster circuit 31 themselves linked to a time base 32.

A signal generated from the video screen raster return signal and the luminance signal are fed into an AND gate 33 whose output is linked to an address register 42. This address register 42 is connected to an address comparator 34 which receives, from a dial 35, a reference address which is that ascribed to the sector where the driver is. Comparator 34, in the event of coincidence of the reference address and the address read during the raster return interval, emits an output signal which opens AND gate 36 giving access to a variable-image memory throughout the duration of two rasters. Consequently, only the variable images corresponding to the designated sector are received by the variable-image memory.

The luminance signal leaving luminance amplifier 28 is fed into a pulse code modulator 37 which receives clock signals from time base 32. The encoded samples are entered in memory 38. The plan or map is stored in memory 39. The samples of the fixed and variable memories having the same address in memory are related to one and the same point on the screen. Memories 38 and 39 are scanned in synchronism by time base 32 and the output signals are added in addition circuit 40. The output of this addition circuit is connected to the grid of image tube 41. This tube is scanned conventionally by the scanning circuits included in the line synchro and raster synchro circuits.

In a further example of assisted motor vehicle traffic flow (FIG. 5), the transmitter unit, instead of periodically transmitting images of indication and build-up signals valid at a given moment, transmits only, each time there is a change in the traffic situation, a first image of the indication and build-up signals which are cancelled, a second image of the indication and build-up signals which are held, and lastly a third image of the indication and build-up signals which are new. The three images carry the same address and all three thus open inhibition gate 36. The address does, however, include an index not taken into account when selecting images to be received in a given receiver unit but which is intended to mark one of three marking terminals A, B, C of address register 42.

Moreover, the samples received are memorized not directly in variable-image memory 38 but rather in a buffer memory 44.

When the receiver unit receives the images of the signals to be cancelled, address register 42 supplies a 1 at its A terminal which opens gates $43_A$ and $45_A$. Memories 38 and 44 are scanned in synchronism and each time a 1 is read in memory 44, a 0 is entered in the corresponding memory location in memory 38, thereby causing the obsolete indication and build-up signals to be blanked out.

When the receiver unit receives the images of the signals to be held, they are validated by a comparison process. Address register 42 supplies a 1 at its B terminal which opens gates $43_B$ and $45_B$ interposed between the respective outputs of memories 38 and 44 and a comparator 46. This comparator compares the samples of identical location in the two memories and produces a 1 at the output in the event of a positive comparison. This 1 is fed to input gate $47_B$ in variable-image memory 38. As a result, should the comparison be positive, then the signals read in 38 are re-entered therein. Were the comparison to be negative, then the case of a signal being contained in 38 and not contained in 44 is distinguished from the case of a signal being contained in 44 and not contained in 38. These discordances are settled to the benefit of memory 38. In the first case, the signal read in 38 is re-entered therein via gate $48_B$. In the second case, the signal is directed towards an error memory 50 via gate $49_B$. Finally, upon receiving the new indication, AND gate $43_C$ is opened by a 1 at terminal C of address register 42 and there is a transfer from the buffer memory to the variable-image memory.

Figure 5:
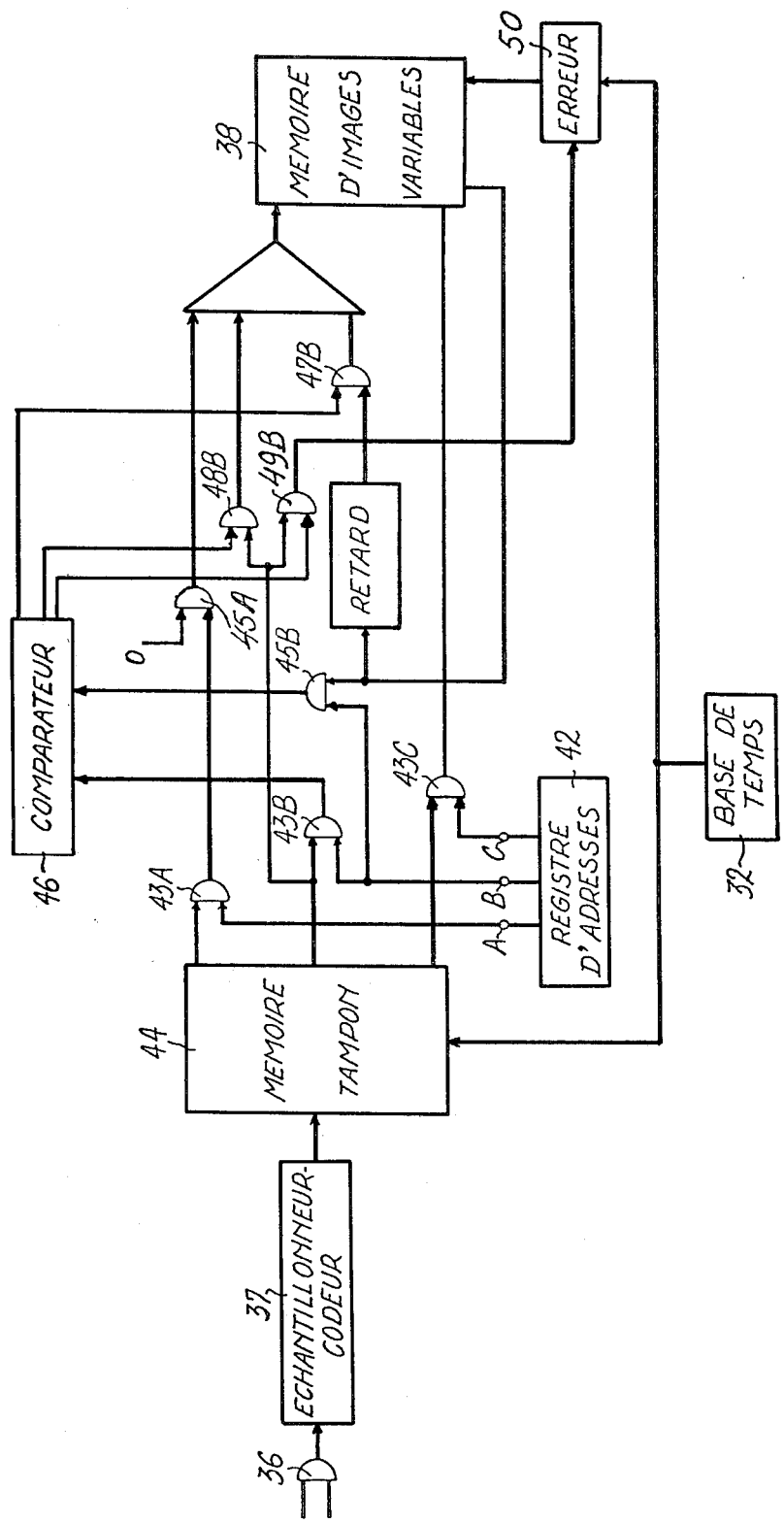
FIG. 5 represents, in block-diagram form, a modification of the receiver unit in FIG. 4.
Figure 6:
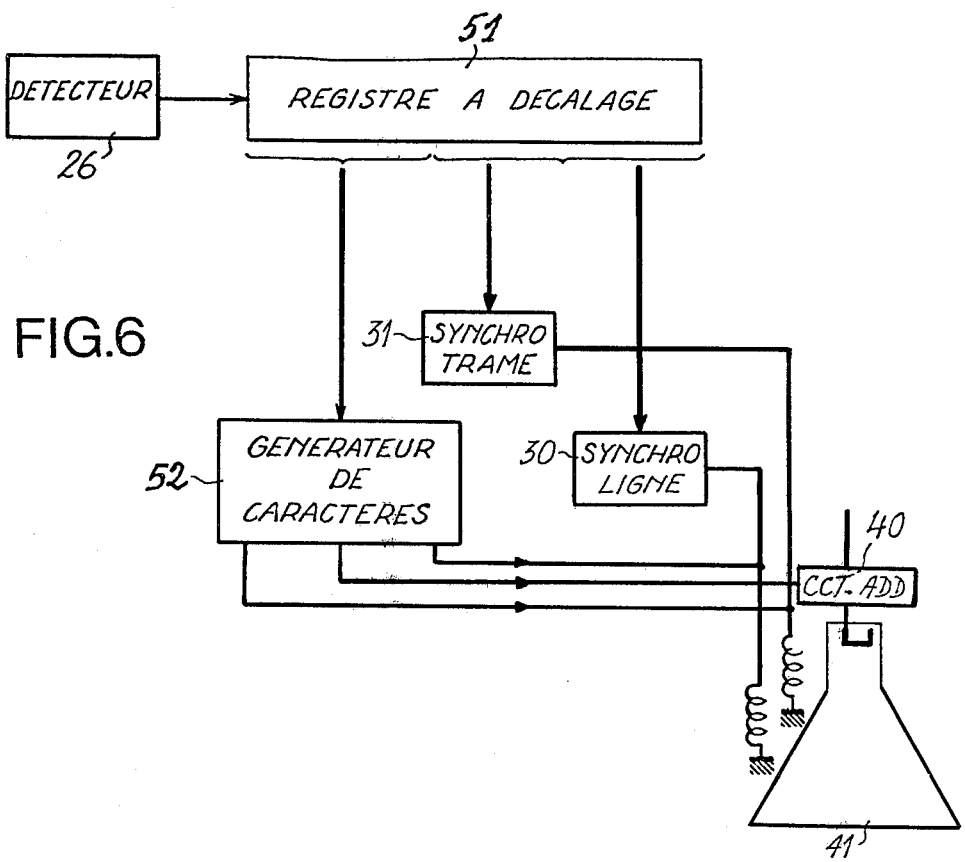
FIG. 6 represents, in block-diagram form, a receiver unit in a second embodiment of the system.

In FIGS. 4 and 5, the supposition was made that the traffic flow and build-up indication signals were transmitted in video form. In FIG. 6, it is supposed that these signals are transmitted in the form of a message containing identification information for a character and the co-ordinates of this character on the screen.

On FIG. 6, detector 26 is again shown and behind this detector is a shift register 51 which receives the character's identification number and co-ordinates. The co-ordinates are transmitted to synchro-line 30 and synchroraster 31 circuits which contain the beam digital control circuits. The character's identification number is transmitted to a character generator 52 which is connected via addition circuit 40 to the grid in the display tube. As it is well-known, the beam digital control circuit directs the beam to that point on the screen where the character must be located and the character generator controls the beam for the character outline.

Figure 7:
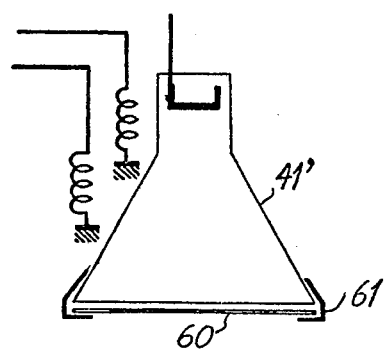
FIG. 7 represents a display screen covered by a plan on a translucent plate.

Lastly, FIG. 7 depicts a display tube 41 over the screen of which a slide 60 can be positioned in runners 61, containing the desired plan or road map. In this case, read-only memory 39 is no longer necessary.

Although the invention has been described in reference to specific example embodiments, it is quite clear for specialists in the field that numerous variations are possible.

The application adopted in the foregoing description was that of a system for assisting traffic flow by transmitting vehicle movement signals depicting areas of traffic build-up. The invention may obviously be applied, without being modified, to destination points served by passenger or freight transport vehicles. The data then transmitted refers, for example, to encircled numbers the centres of which appear on the map at the point being served. The number represents the order of the service point in a vehicle's "round".

Similarly, the lay-out and the choice of the circuits can lend themselves to variations. For instance, although the display tube described is of the cathode ray type, another type of tube could be employed instead, such as a plasma tube for instance.

The scope of the invention is defined not by the examples described but rather by the claims appended hereto.

What we claim is:

1. System for video display by superposing, on the screen of a vehicle-based receiver's image tube, a relatively high definition image defining a road map or a town plan selected from amongst a plurality of such map or plan images and a relatively low definition image defining indication signals to be represented on the map or the plan for information purposes, said system comprising:

means for radio transmitted a plurality of data items related to said low definition images, said data items including respective addresses;

means for selectively receiving said data items having a given address;

memorizing means for storing said data items having said given address;

means for displaying said road map or town plan image on the said image tube screen; and, means for scanning said memorizing means containing the data items at a predetermined frequency and for displaying the corresponding low definition image on the said screen.

2. Video display system in accordance with claim 1, in which the means for displaying the road map or the town plan image on the image tube screen consists of a representation of the said map or the said plan on a transparent holder and of means for positioning this holder against the image tube screen.

3. Video display system in accordance with claim 1, in which the means for storing the data items having a given address is a random access memory and the means for displaying said road map or town plan consists of a read only memory and means for scanning said read only memory, said read only memory scanning means being synchronous with said random access memory scanning means.

4. Video display system in accordance with claim 1, in which the means for radio transmitting a plurality of data items related to said low definition images transmits the said images as video signals and the means for selectively receiving said data items and the memorizing means for storing them consists of a television receiver, a sampler of said video signals, a pulse code modulator for coding said samples and a random access memory for storing said coded samples.

5. Video display system in accordance with claim 1 in which the means for radio transmitting a plurality of data items related to said low definition images transmits symbol co-ordinates and identification numbers for said symbols and the means for selectively receiving said data items, the memorizing means for storing them and the means for scanning said memorizing means consists of a co-ordinate receiver and a symbol identification number received, a symbol generator controlled by the said symbol identification number receive, and a cathode ray tube whose beam is controlled by the co-ordinate receiver and the symbol generator simultaneously.

6. System for video display by superposing, on the screen of an image tube, a relatively high definition image made up of a road map or a town plan chosen from amongst a plurality of such maps or plans and a relatively low definition image consisting of indication signals to be represented on the map or the plan for information purposes, said video display system comprising:

means for radio transmitting a plurality of data items relating to said low definition images, wherein these data items contain an address and are split into the three categories of obsolete data, held data, and new data trasmitted successively;

means for receiving the said obsolete, held and new data;

a buffer memory for temporarily storing said data;

a random access memory containing said held and new data;

means for cancelling, in the random access memory, the obsolete data temporarily stored in the buffer memory;

means for transferring the new data from the buffer memory to the random access memory;

means for comparing the held data contained in the buffer memory and the random access memory respectively, and for validating them in the random access memory in the event of positive comparison or in the event of negative comparison when they already exist in the random access memory;

means for error indication actuated in the event of negative comparison when the held data are contained in the buffer memory and not in the random access memory;

means for displaying the road map or the town plan on the said image tube screen; and, means for scanning the said random access memory containing the data relating to the low definition image at a predetermined frequency and for displaying said low definition image on the said screen.

* * * * *